United States Patent [19]

Thompson et al.

[11] Patent Number: 4,637,498
[45] Date of Patent: Jan. 20, 1987

[54] SELF ADJUSTING ACTUATOR FOR VEHICLE BRAKES

[75] Inventors: Richard E. Thompson, Gwent, Wales; Robert G. Uzzel, Redditch, England

[73] Assignee: Lucas Industries, Birmingham, England

[21] Appl. No.: 697,509

[22] Filed: Feb. 1, 1985

[30] Foreign Application Priority Data

Feb. 9, 1984 [GB] United Kingdom ............ 8403388

[51] Int. Cl.⁴ ............................................ F16D 65/56
[52] U.S. Cl. .................... 188/71.9; 188/72.6; 188/196 D; 188/196 V
[58] Field of Search ............ 188/71.8, 71.9, 72.6, 188/72.8, 72.9, 196 V, 368, 369, 370, 196 D

[56] References Cited

U.S. PATENT DOCUMENTS 3,885,653  5/1975  Farr .......................... 188/71.9 X
4,386,685  6/1983  Cole et al. ................. 188/71.9 X

FOREIGN PATENT DOCUMENTS 55-100434  7/1980  Japan ........................... 188/71.9
1553874   10/1979  United Kingdom .

Primary Examiner—Duane A. Reger
Assistant Examiner—Richard R. Diefendorf
Attorney, Agent, or Firm—Holman & Stern

[57] ABSTRACT

A vehicle brake actuator has actuator components in the form of a cylinder body and a piston operatively associated respectively with a non-rotatable adjuster shaft and a rotatable nut member threadedly interengaged by way of a reversible screw thread connection, the nut member being arranged to follow brake-applying movement of the component being movable axially along the shaft by rotating therealong when adjustment is required and being otherwise prevented from rotation by a clutch. The piston includes an auxiliary piston part axially and rotationally movable relative thereto and arranged to be manually operable from the exterior of the actuator. The piston part is provided with axial projections, which upon axially inward movement of the piston part, may be brought into engagement with recesses in the nut member, whereby the nut member may be wound along the shaft to de-adjust the adjuster without the necessity to rotate the piston. Pressure applied to the auxiliary piston part overcomes the force of a spring, upon the occurrence of excessive braking loads to prevent actuation of the adjuster which is thereby rendered load-insensitive.

13 Claims, 3 Drawing Figures

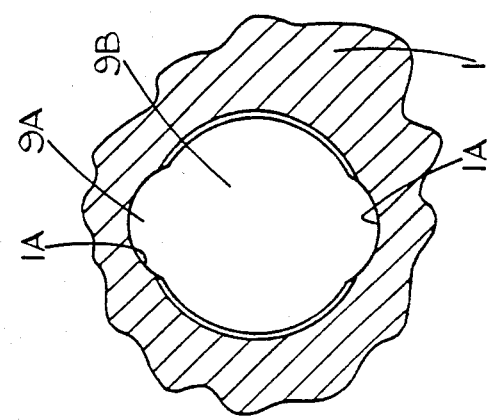
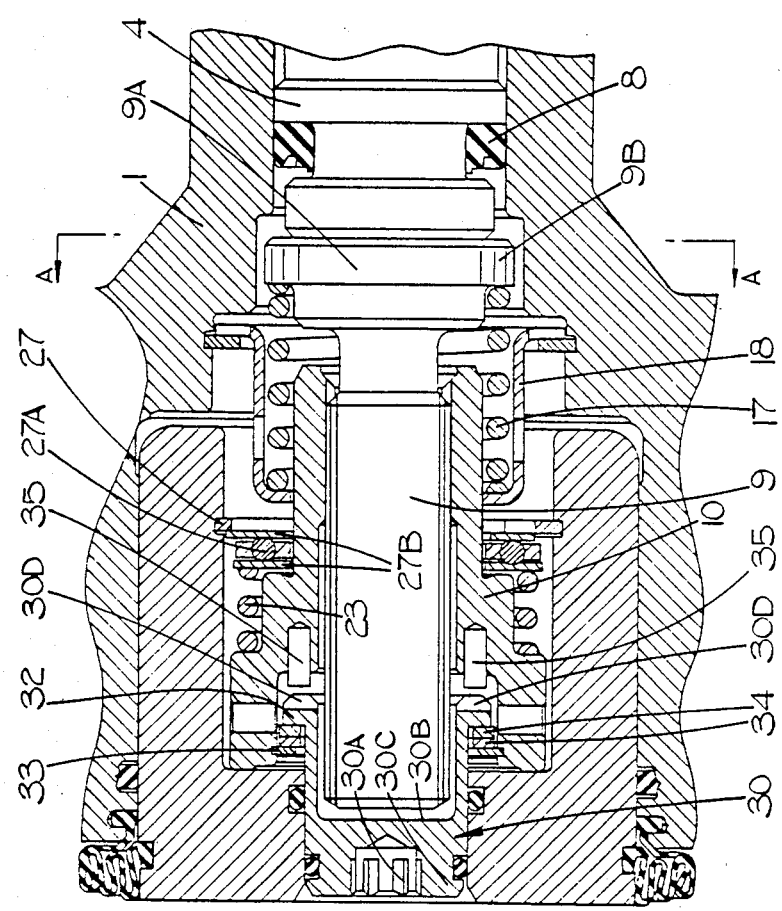
FIG. 3.
FIG. 2.

SELF ADJUSTING ACTUATOR FOR VEHICLE BRAKES

BACKGROUND OF THE INVENTION

This invention relates to a brake actuator incorporating an automatic adjuster and primarily for use with a disc brake. The actuator of the invention is of the general kind in which a pair of actuator components are separable by the application of hydraulic pressure and are associated respectively with first and second adjuster members which are interengaged by means of a screw threaded connection, one of said adjuster members being rotatable and the other being non-rotatable. The rotatable adjuster member is arranged to follow brake-applying movement of one of the actuator components and moves axially relative to the other adjuster member by rotation therealong in response to excessive movement of said one actuator component, clutch means normally preventing rotation of said rotatable adjuster member until adjusting movement thereof is required.

An actuator of this general kind is described in British Pat. No. 1553874 which, in FIG. 4, illustrates an actutor wherein the rotatable adjuster member is normally urged into clutching engagement with the actuator piston and in order to rotate this adjuster member manually to retract the piston for servicing purposes for example, it is necessary to rotate the piston itself. This must not only be effected against the substantial friction of the pressure seal for the piston and the piston boot, but also leads to undesirable twisting of the boot. Although the boot may be removed to obviate part of the problem this is regarded as undesirable, since ingress of dirt may result. It is also possible, with this prior arrangement, to wind back the rotatable adjuster member to such an extent that it locks against an internal rotationally fixed component of the actuator, thereby rendering the adjuster inoperable, when the brake is next applied.

An object of the present invention is to provide a brake actuator in which manual de-adjustment may be readily effected without giving rise to the aforesaid problems.

SUMMARY OF THE INVENTION

According to the invention, a brake actuator comprises a pair of actuator components separable by the application of hydraulic pressure and associated respectively with first and second adjuster members which are interengaged by means of a reversible screw threaded connection, one of said members being rotatable and the other non-rotatable, the rotatable member being arranged to follow brake-applying movement of one of the actuator components and being movable axially relative to the other adjuster member by rotation therealong in response to excessive movement of said one actuator component, clutch means operable under spring force normally to prevent rotation of said rotatable adjuster member until adjusting movement thereof is required, said one actuator component including an auxiliary part axially and rotationally movable relative to said one component and in fluid-tight relationship with the latter, said auxiliary part being manually operable from the exterior of the actuator to drivingly engage the rotatable adjuster member so that by rotation of the auxiliary part, the adjuster member may be rotated relative to said one actuator component in a direction to effect de-adjustment of the adjuster.

Preferably, said auxiliary part is arranged in such a manner as to limit the possible de-adjustment movement of said rotatable adjuster member. This may conveniently be achieved by arranging for the auxiliary part to abut the non-rotatable adjuster member when the desired limit of de-adjustment is reached.

It is preferable for the auxiliary part and adjuster member to be provided respectively with positive complementary driving means which co-operate to effect said driving engagement and which may be arranged to become disengaged, following abutment of the auxiliary part and adjuster member, to prevent excessive de-adjustment movement of the rotatable member such as would result in locking of said member against a fixed axially opposed surface.

In one convenient arrangement, said one actuator component is a main piston slidable within a body forming the other component and said clutch means is constituted by mutually opposed surfaces respectively on the main piston and rotatable adjuster member, said auxiliary part being mounted in an axially facing end wall of the main piston and having a hollow portion arranged to receive part of the non-rotatable adjuster member therein. The auxiliary part may conveniently engage the rotatable adjuster part in normal use by way of a low-friction bearing.

BRIEF DESCRIPTION OF THE INVENTION

The invention will now be described, by way of example, with reference to the accompanying drawings in which:

FIG. 2 is a longitudinal cross-section in a different plane of an alternative embodiment, and FIG. 3 is a detail cross-section along the line A—A of FIG. 2

DETAILED DESCRIPTION OF THE INVENTION

Figure 1:
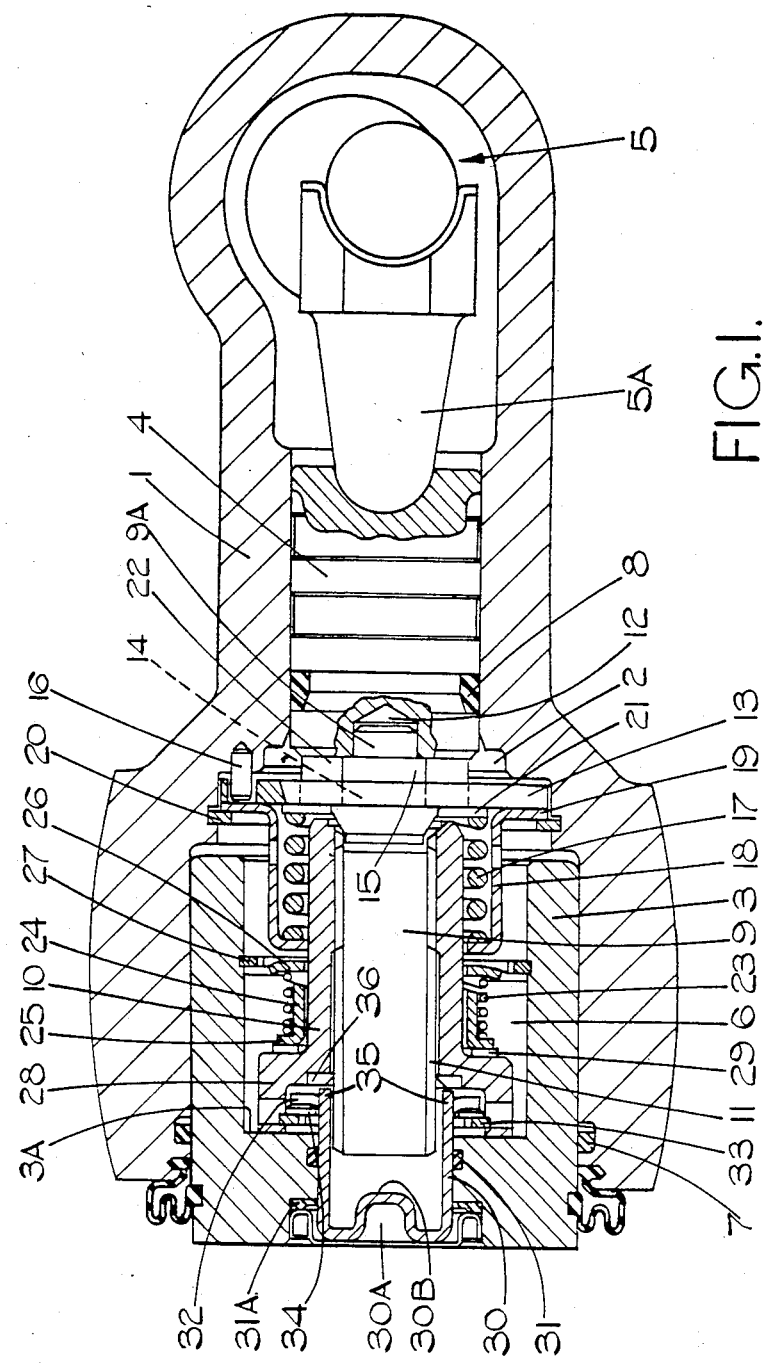
FIG. 1 is a longitudinal cross-section of part of one form of the brake actuator of the invention.

Referring to FIG. 1 of the drawings, this shows part of the body 1 of an hydraulic actuator for a disc brake, the body having a through bore 2 of which a relatively large diameter open-ended portion contains a hollow main piston 3 slidable therein and a relatively small diameter portion contains a rod 4 which co-operates with a mechanical actuator 5. A pressure chamber 6 is defined between the body 1 and piston 3, fluid-tight integrity of the chamber being ensured by a piston seal 7 and a further seal 8 surrounding the rod 4. The piston 3 acts directly on one of a pair of brake pads (not shown) which co-operates with a braking surface formed on one side of a brake disc (not shown) attached to a member to be braked. The other brake pad is operated indirectly, in conventional manner, by a yoke (not shown) on the body 1 and co-operates with a braking surface on the other side of the brake disc.

The actuator is provided with an automatic adjuster which includes a screw member 9 and a nut member 10 surrounding the screw member 9, the screw and nut members being housed within the hollow piston 3 and interconnected by a reversible screw threaded connection 11. The rear end of the screw member 9 is provided with a co-axial projecting spigot 9A which is engaged with a corresponding socket 12 in the end of the rod 4. Rotation of the screw member 9 relative to the actuator body is prevented by a locking plate 13 having a hole 14 therethrough which is provided with a pair of opposed straight sides which, when the adjuster member 9 is received within the plate, engage against flats, one of which is shown at 15, on the adjuster member. The plate 13 is locked against rotation relative to the body 1 by one or more pins 16, which provide no axial restraint so that the adjuster member 9 is able to mvoe axially relative to the rod 4.

The adjuster screw 9 is urged towards the rod 4 by a spring 17 which surrounds the adjuster screw and is contained within a cup-shaped abutment member 18 of which a radial flange 19 is trapped between the retainer 13 and a circlip 20 lodged in a groove of the body 1, so that the abutment member is effectively rigid with the body. The spring 17 acts between the internal end surface of the abutment member 18 and an abutment washer 21 which bears against a radial flange 22 of the adjuster member 9, on which flange are formed the flats 15. A further spring 23 surrounds a sleeve 24 encircling the nut member 10, the spring 23 being trapped between a radial flange 25 of the sleeve 24 and housed in a groove of the piston 3. The spring 23 acts on an enlarged part 28 of the nut member by way of a low friction thrust bearing 29 so that the spring 23 urges the nut member 10 firmly into engagement with the face 3a of the piston, whilst permitting relative rotation between the nut member and piston. The spring 23 can be considered to apply a clutching force between the piston and nut member which normally prevents relative rotation between these two components.

An auxiliary piston member is provided in the form of a hollow cup 30 mounted co-axially in the end wall of the piston 3 and rendered fluid-tight in relation to the piston by a seal 31. The inner end portion of the cup 30 is provided with radially outwardly extending flange portions 32, between which and a circlip 33 of the adjuster member 10 is interposed a low friction bearing assembly 34 to facilitate rotation of the adjuster member 10 relative to the cup 30. The inner end portion of the cup 30 is also provided with axially inwardly extending portions 35 which are adapted to be engaged within recesses 36 in the opposed end wall of the adjuster member 10, for the purpose to be described.

Mechanical operation of the actuator is effected in conventional manner by means of the mechanical actuator 5 which acts through a dolly 5a upon the shaft 4, from which actuating force is transmitted via the adjuster screw 9, nut 10 and piston 3 onto the directly actuated friction pad of the brake, the indirectly actuated pad being actuated by the aforesaid caliper yoke, as will be well understood. The nut member 10 is urged by the actuating force firmly into engagement with the end surface 3a of the piston 3 so that resistance is provided against rotation of the nut relative to the piston and adjuster shaft. Additional resistance to such rotation is afforded by the engaging flanks of the reversible threaded connection 11. The adjuster will thus remain inactive during mechanical actuation of the brake.

When the actuator is operated hydraulically, by introduction of hydraulic fluid under pressure into the chamber 6, the piston 3 moves outwardly of the body 1 to apply one of the friction pads against the disc, the other pad again being applied indirectly, as before. The nut member 10 moves with the piston relative to the screw member 9, which is loaded by the spring 17 towards the rod 4, a maximum running clearance being established by permitting a predetermined axial displacement to occur at the screw threaded ocnnection 11. With the brake pads in unworn condition, relative movement between the nut and screw members remains within said permitted axial displacement and the adjuster remains inoperative. However, as pad wear occurs, the piston 3 is required to move further in order to apply the pad to the disc thereby creating a gap between the piston face 3a and the end of the nut member. Since the permitted axial displacement in the screw thread connection will now have been taken up, and because the screw member is prevented from rotation by the locking plate 13 and from axial movement by the action of the spring 17, such further outward axial movement of the piston will have the effect of compressing the spring 23, causing the nut member to rotate along the screw member under the influence of the spring 23 until the end of the nut member once again abuts the piston face 3a. When the hydraulic pressure is relieved, the nut member and piston are once more retained firmly in engagement at the surface 3A, thereby precluding rotation of the nut member back along the screw thread and thereby maintaining the piston 3 in a new outwardly adjusted position.

The aforesaid adjusting action depends upon the ability of the spring 17 to prevent the adjuster screw 9 from moving axially with the nut. For normal braking pressures, the pressure applied to the cup 30 over the area of the seal 31 normally creates insufficient force to overcome the force of the spring 17 and the assembly operates as described above. In the event of excessively heavy braking occurring, which would lead to large deflections in the brake components, for which compensating adjustment is not required, the force resulting from the braking pressure acting on the cup 30 transmitted via the bearing assembly 34 nut member 28 and shaft 9 to the spring 17 at these high braking loads is sufficient to compress the spring 17, enabling the screw member 9 to move with the nut and the adjuster is thereby rendered load-insensitive. It should also be noted that upon excessive compression of the spring 23, which may arise, for example, should the nut member fail to follow the piston for any reason, the abutment member 26 will engage the end of the sleeve 24 to ensure that the required movement of the nut member occurs.

When it is desired to manually de-adjust the adjuster from a brakes-worn condition, in order to service the brake for example, this may be effected by inserting a suitably shaped tool into a recess 30A formed in the end of the cup 30 and urging the cup inwardly until the detents 35 engage within the recesses 36 of the nut member, thereby enabling the nut member to be rotated along the screw member in the desired direction to permit de-adjustemnt. It will be seen that this de-adjustment operation may be carried out without rotation of the piston 3 and against only the relatively small rotational resistance of the seal 31 and a dirt excluding seal 31A.

The cup provides an additional advantage in that the depth of the recess 30A can be chosen such that the inner end 30B thereof will abut the opposed end of the adjuster screw at a predetermined position of the nut on the screw.

This, in itself will provide a detectable indication that the limit has been reached and rotation of the adjuster member may be stopped. In addition, however, the arrangement is preferably such that continued rotation of the adjuster member after said abutment has occurred will move that member axially sufficiently to interrupt said driving engagement with the auxiliary part prior to an axially facing surface of said member jamming against an oppposed surface.

FIGS. 2 and 3 illustrate an alternative embodiment which is generally similar in arrangement and function to that of FIG. 1 and will only be described in detail as regards significant differences.

The auxiliary part 30 has a solid end portion 30C in which is formed a suitably shaped recess 30A for engagement by a driving tool. A radial flange 32 at the inner end of the part 30 faces an opposed circlip 33 and a pair of low friction washers 34 are interposed to facilitate rotation of the adjuster member 10 relative to the circlip. The part 30 now has recesses 30D for driving engagement with a corresponding number of pins 35 projecting from the facing end of the adjuster member 10 when de-adjustment is required. Once again, the dimensions of the various components and tolerances are such that, once the inner end 30B of the part 30 has engaged the outer end of the adjuster screw 9, further rotation thereof will cause driving engagement to be interrupted when the nut reaches a predetermined position, in order to prevent excessive de-adjustment. By further contrast with FIG. 1, the sleeve 24 is omitted and the spring 23 now engages directly around the adjuster member 10 and bears against the circlip 27 by way of an interposed ball race 27a disposed between a pair of washers 27B. This arrangement virtually eliminates any tendency for torque build-up in the spring 23 as a result of rotation of the adjuster member 10.

As previously, the spring 17 is housed within a cup 178, the latter engaging against a circlip 20 whereby the spring force is reacted against the body 1. In this embodiment, however, the pin 16 and keying plate 13 are omitted and the shaft 9 is keyed to the housing by engagement of diametrically opposed hemispherical protrusions 9A on a flange 9B thereof engaging complementary recesses 1A formed in the body 1.

Actuation and adjustment take place as described in relation to FIG. 1, handbrake actuation being via a mechanism (not shown) similar to that illustrated in FIG. 1.

We claim:

1. A brake actuator, comprising: a pair of actuator components separable by the application of hydraulic pressure and associated respectively with first and second adjuster members which are interengaged by means of a reversible screw threaded connection; one of said members being rotatable and the other non-rotatable, the rotatable member being arranged to follow brake-applying movement of one of the actuator components and being movable axially relative to the other adjuster member by rotation therealong in response to excessive movement of said one actuator component; a clutch means operable under spring force normally to prevent rotation of said rotatable adjuster member until adjusting movement thereof is required; said one actuator component including an auxiliary part which is axially and rotationally movable relative to said one component and which is in fluid-tight relationship with the latter; said auxiliary part being manually operable from an exterior of said one actuator component to drivingly engage said rotatable adjuster member, so that, by roatation of said auxiliary part, said rotatable adjuster member can be rotated relative to said one actuator component in a first direction to effect de-adjustment of the adjuster; said auxiliary part being moveable into engagement with said rotatable adjuster member for de-adjustment of said reversible screw threaded connection, and subsequently being disengaged therefrom.

2. An actuator according to claim 1 wherein said auxiliary part limits the possible de-adjustment movement of said rotatable adjuster member.

3. An actuator according to claim 2 wherein said auxiliary part abuts said non-rotatable adjuster member when a predetermined limit of de-adjustment is reached.

4. An actuator according to claim 1 wherein said auxiliary part is a piston subject to said hydraulic pressure for movement with said one actuator component.

5. An actuator according to claim 4, wherein movement of said piston with said one actuator component is limited by abutment of said piston with said one rotatable adjuster member, movement of the other adjuster member being resisted by spring means urging it away from the piston, such that when said hydraulic pressure attains a predetermined value, the resultant force on said piston overcomes the force of said spring means to allow said adjuster members to move as an assembly in the same direction and thereby prevent the occurrence of adjusting movement of said members during maintenance of said pressure at or above said value.

6. An actuator according to claim 5, wherein said clutch means includes a surface of said rotatable adjuster member and a co-operating opposed surface of said one actuator component, said rotatable adjuster member being urged by resilient means in a direction towards said one actuator component.

7. An actuator according to claim 6 wherein said resilient means exerts less force than said spring force; and the latter urges said other adjuster member against a relatively fixed surface until overcome by said hydraulic pressure reaching said predetermined value.

8. An actuator according to claim 1 wherein said auxiliary part and said rotatable adjuster member are provided respectively with positive complementary driving means which co-operate to effect said engagement.

9. An actuator according to claim 8, wherein said driving means are adapted to become disengaged, following engagement of the auxiliary part and rotatable adjuster member, to prevent excessive de-adjustment movement of said rotatable adjuster member.

10. An actuator according to claim 8, wherein said piston is of hollow thin-walled form with respectively open and closed ends, the open end having spaced peripheral portions bent radially outwardly to form a divided peripheral flange, thereby leaving between such portions at least one axially extending tooth constituting one of said driving means for engagement with said other driving means in the form of a recess on the rotatable adjuster member, the piston abutting said one rotatable adjuster member by way of said flange.

11. An adjuster according to claim 10, wherein said piston flange abuts said one rotatable adjuster member by means of a low friction bearing.

12. An actuator according to claim 8 wherein said piston has a radial peripheral flange which abuts said one rotatable adjuster member, the piston having at least one inwardly facing recess constituting one of said driving means for engagement with the other of said driving means including projections on said rotatable adjuster member.

13. An actuator according to claim 1 wherein said one actuator component is a main piston slidable within a body forming the other component, and said clutch means including mutually opposed surfaces respectively on the main piston and rotatable adjuster member, said auxiliary part being mounted in an axially facing end wall of the main piston and having a hollow portion adapted to receive part of said non-rotatable adjuster member therein.

* * * * *